United States Patent [19]
Silver

[11] 4,216,623
[45] Aug. 12, 1980

[54] PLANT WATERING SYSTEM AND PROCESS

[76] Inventor: Stanley M. Silver, 1331 Lincoln Rd. #705, Miami Beach, Fla. 33319

[21] Appl. No.: 896,753

[22] Filed: Apr. 17, 1978

Related U.S. Application Data

[63] Continuation-in-part of Ser. No. 800,185, May 25, 1977, Pat. No. 4,096,663.

[51] Int. Cl.² ............................................. A01G 27/00
[52] U.S. Cl. ...................................................... 47/80
[58] Field of Search ................... 47/9, 66, 67, 73, 74, 47/75, 79, 80, 81, 85

[56] References Cited

U.S. PATENT DOCUMENTS

| | | | |
|---|---|---|---|
| 1,214,356 | 1/1917 | Natvig | 47/80 |
| 1,317,569 | 9/1919 | Forster | 47/79 |
| 1,928,810 | 10/1933 | Burford | 47/80 |
| 2,055,844 | 9/1936 | Kneller | 47/79 |
| 2,629,204 | 2/1953 | Dodds | 47/80 |
| 3,193,970 | 7/1965 | Green | 47/80 |
| 3,243,919 | 4/1966 | Carlson | 47/79 |
| 3,958,365 | 5/1976 | Proctor | 47/9 X |
| 4,001,967 | 1/1977 | Swift et al. | 47/80 |
| 4,023,308 | 5/1977 | Staby | 47/58 X |
| 4,096,663 | 6/1978 | Silver | 47/80 |

FOREIGN PATENT DOCUMENTS

| | | | |
|---|---|---|---|
| 148819 | 3/1903 | Fed. Rep. of Germany | 47/71 |
| 526466 | 10/1921 | France | 47/81 |
| 1527176 | 5/1968 | France | 47/81 |
| 146637 | 4/1931 | Switzerland | 47/80 |
| 4743 | of 1894 | United Kingdom | 47/79 |
| 11890 | of 1900 | United Kingdom | 47/81 |

*Primary Examiner*—Edgar S. Burr
*Assistant Examiner*—James R. Feyrer
*Attorney, Agent, or Firm*—Laff, Whitesel & Rockman

[57] ABSTRACT

In a co-pending parent application, a plant watering system comprises a porous inner pot positioned at an elevated location within a water-impervious outer container. Water within the outer container wicks by capillary action up the side walls of the porous pot and wets any soil or like growing medium contained within the inner pot. The lower part of the inner pot is coated with a water-impervious layer to control the elevation at which the wicking water may enter the soil. Also, a special pot liner enables gases to be bi-directionally vented throughout a selected region in the bottom of the inner pot. When desired, water may be drained out the bottom of the inner pot. The inventive process adjusts the percentage of moisture maintained by soil, or the like, by rating the moisture needs of plant species, the season of the year, and the type of growing medium used. Such a process enables a plant grower to select a preferred level of water in the outer container and, therefore, the distance over which the water must travel by capillary action through the porous wall. That distance regulates the amount and rate at which the soil is replenished with moisture. This continuation-in-part is primarily directed to means for and methods of improving upon the structure described in the parent application and particularly to improvements which reduce manufacturing costs while enhancing the system performance.

1 Claim, 16 Drawing Figures

PLANT WATERING SYSTEM AND PROCESS

This is a continuation-in-part of a co-pending patent application, Ser. No. 800,185, filed May 25, 1977, now U.S. Pat. No. 4,096,663.

This invention relates to self- or auto-moisturizing containers for plants. More specifically, it relates to auto-moisturizing containers that recognize the physiological and cultural requirements of most plant species and provides a simple, dependable and practically automatic system that enables conventional plant owners to care for their plants more effectively than was heretofore conveniently possible.

The number of ornamental house plants sold annually has grown dramatically in recent years. However, many of these plants fail during the first year after their sale owing to improper watering. The problem of correct watering is ever present, whether the plant is at the growers, in transit, on the retailer's shelf or in the consumer's home.

Although one generally thinks of proper moisturizing as merely providing water for a plant, this is not botanically correct. Properly watering a plant, in fact, is the attempt to provide a proper balance of moisture and oxygen for the root system; both are equally essential.

In soil, moisture and oxygen are present in an inversely proportionate ratio. Thus, as the moisture content of the soil increses, the oxygen level decreases. A severe imbalance between oxygen and water, to the disfavor of either, reduces, if not stops, photosynthesis.

For many plant species, "overwatering" actually has little or nothing to do with an excess of water. More likely, the root system of the plant is deprived of an adequate supply of essential oxygen. For example, many plants can be successfully grown with their root systems completely submerged in water if a proportional increase in the oxygen supply is made available. An area of agriculture called "hydroponics" has long used this form of cultivation.

The maintenance of a proper moisture/oxygen balance optimizes the phothsynthetic process for a plant and, therefore, a plant's growth, assuming that other essential environmental factors are present. If the percentage of soil moisture is reduced, the plant roots must spend additional energy in order to osmotically obtain moisture. This necessarily diminishes the energy which would otherwise be available for growth. A deprivation of oxygen by "overwatering" similarly reduces the growth process.

Most ornamental house plants carry out photosynthesis most efficiently when the moisture percentage in the soil is between 5-70%, which is the optimal moisture/oxygen balance. Certain plant species experience stress if the moisture level drops to approximately 40%. Conversely, other species experience oxygen deprivation if the moisture level is above the 80% level.

Plant roots develop randomly and omni-directionally, but survive in any direction only to the extent that moisture is immediately encountered and assimilable. When aridity is encountered, the most efficient fine root endings quickly atrophy. Thus, to achieve optimal growth, the majority of container plants require "evenness" of moisture. By "evenness" I refer to the percentage of moisture present in the soil, the spatial distribution of the moisture, and the mean moisture level over time, not merely the average moisture level.

It may initially appear to be a simple matter to maintain a 50-70% moisture level evenly distributed in the soil, but plant owners find that to do so is not practically possible. By way of illustration, consider the conventional watering of a house plant. If one follows the recommended teachings and begins by saturating the soil mass, the immediate condition of the soil is 100% capillary moisture. Until the moisture level drops below 80%, photosynthesis is limited by a shortage of oxygen. Typically, most house plants will stay 100% moist for two days after being saturated. For the subsequent two days, the moisture level will most often remain between 70% and 50% and on the fifth day the soil is semi-arid. Depending on the attentiveness of the plant owner, this arid condition may continue for a number of additional days, often causing residual damage. Thus, during a typical watering cycle, the plant usually experiences an optimal moisture/oxygen balance during only a small portion of the time.

If the "evenness" of the moisture distribution is also examined, it is found that the entire root system is not exposed to an "even" distribution of moisture. Rather, it usually encouners a concentration of moisture in the lower region of the plant container. This diminishes the size of the root system upon which the remainder of the plant's growth depends.

While the prior art has recognized that properly watering a plant is a difficult matter, the solutions put forward to date have failed to recognize the physiological aspects of moisture/oxygen balance and moisture "evenness." Because of this failure, the solutions offered by the prior art have not found wide acceptance. These prior art auto-watering systems usually use (1) a porous barrier; (2) air pressure to balance the flow of water; and/or (3) a wicking tube.

Consider, for example, the typical prior art involving auto-moisturizing systems. One broad category and perhaps the most relevant prior art for purpose of applicant's invention, is illustrated by the following patents: Radford, No. 2,863,259 (United States); Vallinos, No. 2,344,794 (United States); Damm, No. 814,964 (West Germany); and Leon, No. 2,142,234 (France). This group of auto-moisturing systems provides a reservoir of water that surrounds a porous plant container, such as a clay pot. The primary deficiency with this category is that the porous container cannot properly regulate the flow of water from the reservoir to the entire soil mass. Moreover, the variability in porosity of these natural materials often contributes to overwatering. The moisture level of even lean soil using this type of device is normally near the 100% level, until the reservoir dries out.

Another difficulty with this category of auto-moisturizers is that most moisture is introduced via the bottom of the reservoir, responsive to gravity and hydraulic pressure. This results in a concentration of moisture in the base of the pot, with the upper regions of the soil being lesser moisturized by capillary action. Most plants located in such a container experience substantial oxygen deprivation, most particularly at a lower region.

Some of the inventors have used various forms of valves that reduce the amount of water flowing from the reservoir into the soil. While attacking the problem of constant saturation, the devices offered to date have either failed to reliably regulate moisture flow or they are costly and complicated.

A second category of the prior art recognizes that overwatering is injurious to plant health and seeks to regulate the water flow by encapsulating the exterior walls of the plant pot within a hermetic chamber. This arrangemet utilizes atmospheric pressure to control the amount of moisture that reaches the soil. However, the soil must undergo periods of dryness prior to stimulating the flow of moisture. These structures also diminish the respiratory gas exchange which is needed by the roots. While a conventional clay pot normally provides for excellent aeration, such aeration is inhibited when the pot is partly encapsulated by a hermetic chamber. In addition, by so enclosing a po:, there can be no flow of free liquid through the pot base. Thus, it may no longer be possible to flush the soil, which is normally required on a periodic basis. Relevant prior art patents (all U.S.) known to the inventor in this group consists of: Cloud, No. 3,192,665; Peters, No. 3,775,904; and Crane, No. 3,758,987.

The third major category of prior art employs a wicking principle to transfer water from a reservoir to the soil. Basically, a watering system using a wick has a water reservoir and a wicking tube. One major drawback is that, if the wick dries out at any place along its length or it becomes dislodged from the soil, moisture transmission ceases. Another shortcoming is that the moisture transmitted by the limited area of a wicking tube may be unable to amply replace the moisture lost by the soil in the plant container under warm, dry conditions. The wicking system also fails to provide required "evenness" of moisture because moisture is introduced locally to the soil.

A plant moisturizing system can accelerate growth of plants if it can dependably achieve the proper moisture/oxygen balance, along with the necessary "evenness" of the moisture. If such a system can accomplish this result automatically over an extended period of time with little maintenance, both plants and hobbyists are benefited. The system can measurably improve the growth rate and saleability, and reduce loss of commercially-grown plants.

The present invention recognizes the major physiological needs of living plants and provides an auto-moisturizing system, which overcomes the various shortcomings of the prior art, in a simple, inexpensive, dependable and easy manner.

One embodiment of the present invention employs a conventional clay pot (as defined herein such a pot may comprise side walls only) having a water-impermeable coating surrounding a portion of the interior wall of the pot. The clay pot is joined to an outer container by a watertight adhesive seal, situated so that excess water is readily drainable from the soil mass and air is allowed to freely communicate with much of the soil mass. The exterior of the clay pot faces the outer container, with a water reservoir thereby forming between them. Water in the reservoir cannot come into direct contact with the soil. Rather, moisture wicks up the clay pot walls to the top of the coating over which it may wet the contacting soil.

Accordingly, an object of this invention is to provide new and improved auto-moisturizing containers for plants wherein the moisture/oxygen balance with the soil can be maintained in the optimal range for extended periods.

Another object of the invention is to provide auto-moisturizing plant containers that can distribute moisture with an improved "evenness" so as to maximize the sustained development of the root system.

An object of this invention is to provide new and improved plant watering systems. In particular, an object is to provide improvements in both the manufacture and function of self-watering plant containers, as described in my co-pending U.S. Pat. application, Ser. No. 800,185, filed on May 25, 1977.

Another object is to increase watering benefits to plants in general and particularly for species which are intolerant to an oxygen-deprived growing medium.

Yet another object of the invention is to provide a container which moisturizes plants in an upper soil region at a selected rate, whereby the entire soil mass is thereafter moisturized evenly by a gravitational flow and by a capillary moisture translocation within a typical growing medium and bottom aeration is maximized. Here an object is to prevent surplus gravitational water from dripping out of a bottom drainage except when such is desirable (i.e., when leaching the soil). In this connection, an object is to increase the evaporating surface at the lower region of the container, whereby moisture or moisture vapor may be exchanged between the soil or other growing medium and the containing walls, the moisture being evaporated on a portion of the container.

It is another object of the invention to provide a container of the described character which reduced tooling, material, and assembly costs, thereby reducing the total cost to the user.

A further object is to utilize economical ceramic products which are manufactured by high-speed production methods and to adapt the subject invention in accordance with the normal dimensional variables of such a product. Here, an object is to provide new and improved methods of interconnecting ceramic components and plastic containers with the dimensional variations of ceramic pots. In particular, an object is to form a watertight seal between a dimensionally constant receptacle and a dimensionally variable pot with or without a minimum use of adhesives.

The present invention will be more clearly understood from the following description of a preferred embodiment, which may be read in conjunction with the accompanying drawings, wherein.

Figures 1, 2, 2A:
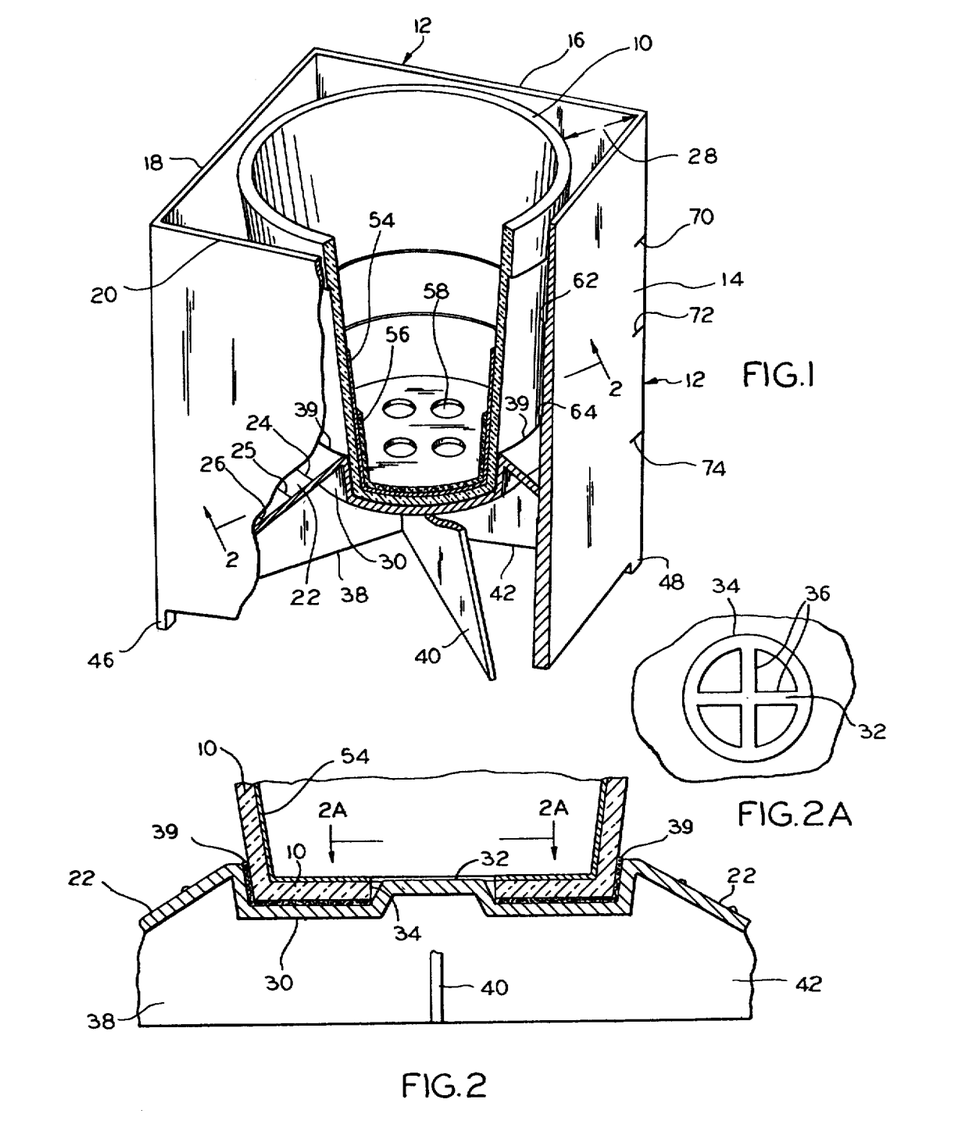
FIG. 1 is a perspective view, partially in cross section, which shows the inventive plant-watering system.
FIG. 2 shows, in cross section, the bottom of a clay pot and its supporting structure, taken along line 2—2, of FIG. 1.
FIG. 2A is a fragmentary cross section of FIG. 2, taken along line 2A—2A thereof, and showing a collar construction in a drainage hole.

In the embodiment of FIG. 1, a conventional porous clay pot 10 is seated in a water-impervious container 12, of any suitable material, such as plastic, glass, or coated permeable substrates, etc. While outer container 12 is here shown in a rectangular, nearly parallelepiped configuration, it may take any convenient form, including decorative shapes (the deviation from a regular parallelepiped configuration is a slight taper to provide a mold draft).

The outer container 12 has four vertical walls, 14,16,18,20 and a bottom 22 of preferably frusto-conical shape, in that it extends upwardly and inwardly from the base of the outer walls. Graduated markings 24,25,26 are formed on bottom 22 to indicate the number of days that a reservoir 28 formed between the pot 10 and container 12 have failed to supply water to the plant, as more fully explained hereinafter. At its center, bottom 22 terminates in a downwardly-extending collar 30 which receives the base of clay pot 10.

As more clearly shown in FIG. 2, collar 30 engages and surrounds a portion of the bottom region of clay pot 10. The collar 30 has a central region 32 that is embossed inwardly to fit through an enlarged drainage hole 34 formed in a clay pot 10 and to rise to a level parallel with the interior bottom of the pot. Thus, the central region 32 of base collar 30 occupies the drainage hole provided in conventional clay pots. Referring to FIG. 2A, the design of the central embossed region 32 consists of an open cross-bracing 36 that forms open regions for allowing drainage and aeration. The lower region of the clay pot 10 is adhered to collar 30 by any suitable waterproof adhesive 38, whereby a waterproof seal to the reservoir results therefrom.

Spaced circumferentially and equally about the bottom of collar 30 is a plurality of struts 38,40,42,44 that support the collar 30 and the clay pot 10. A plurality of risers or feet 46,48,50,52 raise the outer container and enable air to circulate underneath the container 14 and communicate with the openings formed between the cross-braces 36 in the central region 32 of the collar. When the soil is flushed, water may freely drain from the soil mass and out through the clearance space provided by the feet 46–52. By raising the bottom of clay pot 10 above the bottom edge of vertical walls 14–20, water is allowed to freely escape from the clay pot 10 and not to collect inside the pot around the drainage opening 34, and air is allowed to freely circulate under the bottom of clay pot 10 through the opening 34.

While pot 10 has been identified as being made of clay, it may be made of any other suitably adapted porous material. The drainage opening 34 is preferably enlarged substantially to promote aeration. The inner wall surfaces of pot 10 are coated with a waterproof sealant 54, such as paraffin wax or a wax blend of paraffin and viscous additives. This waterproof coating 54 is applied over the entire interior of porous container 10 to a preselected height, such height being increasable as a result of greater pot porosity inducing the vertical migration of wax. This coating 54 fills the pores of pot 10 and prevents water from entering into the interior of pot 10 in the region which is protected by the coating 54.

Figure 3:
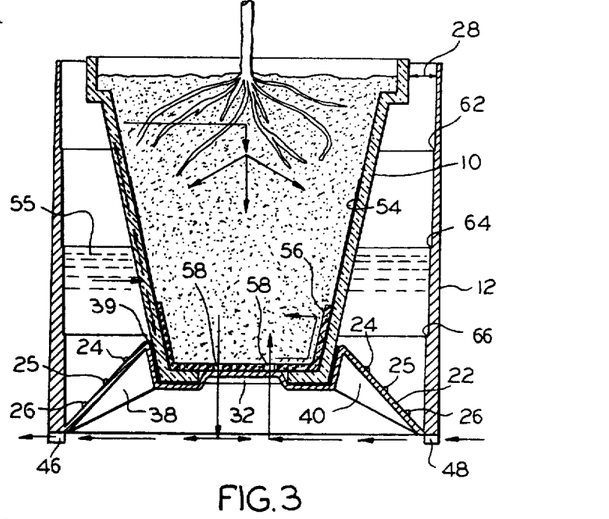
FIG. 3 is a schematic representation of the inventive system of FIG. 1, in elevation.

If reservoir 28 is filled with water, moisture penetrates the porous outer wall of the clay pot and moves upwardly through the wall by capillary action. In the upper zone of the pot, which is uncoated, the soil is made wet by the moisture which is being so transferred by capillary action. Since moisture enters the soil mass in the upper region of the pot, a rain-like watering is reproduced, thereby promoting moisture "evenness." Moreover, by closing off a lower region of pot 10 with the coating 54, the water is prevented from entering and concentrating at the base of the soil mass. The range of penetration and migration of coating 54 also selectively seals the pores of pot 10 in the regions where water would ordinarily be excessively absorbed, thereby substantially overcoming the variations in water transmission rates normally found in porous containers. Also, the moisture flow upwardly balances the hydraulic gradient caused by the water standing in the reservoir 28. Therefore, by controlling the height 55 (FIG. 3) at which the water stands, the moisture may be more selectively metered by the distance of the capillary action.

The interior bottom region of clay pot 10 is lined by a fitment 56 comprising a shallow tray having drainage holes 58 formed therein. Ideally, fitment 56 has a total outside surface area at least equal to the cross-sectional area of the top of clay pot 10. Fitment 56 is made of a material (such as foamed polystyrene) that is impervious to the passage of water, but enables a relatively free passage of gases. The fitment 56 also prevents the soil from escaping through the enlarged opening, at the bottom of pot 10.

Figures 4, 5:
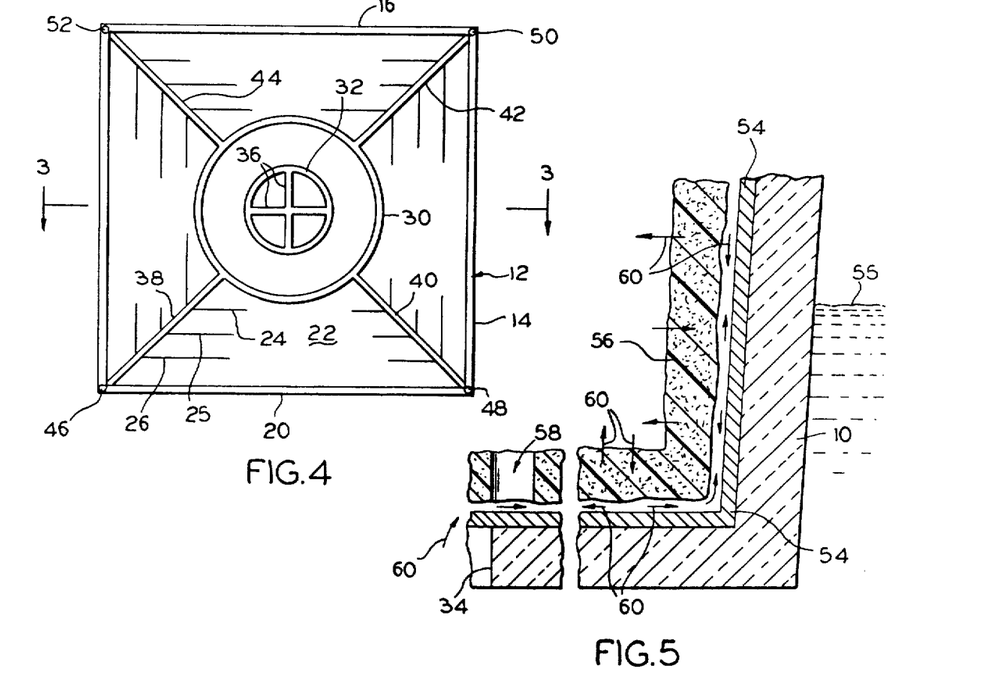
FIG. 4 is a plan view of the bottom of the inventive system.
FIG. 5 schematically indicates how the plant roots are aerated.

The primary function of fitment 56 is to increase the aeration and evaporation capacity of pot 10, as illustrated in FIG. 5. At the base of fitment 56 is a plurality of holes 58, which allows water to be freely evacuated at such times as the plant is flushed. However, since fitment 56 has a relatively uneven surface and fits into the base of pot 10, many small passageways are formed between the coatings 54 and fitment 56, and through interstices in the fitment walls. Thus, air, represented by a plurality of arrows 60, may circulate through the holes between struts 36, the interstices, these passageways and into the soil mass through the fitment 56. Because the fitment 56 allows gas to pass through its walls, the actual aeration in the lower region of pot 10 is substantially greater than it would be through openings 58 alone.

The two component containers adhered by a seal 39 enable the inventive structure to be manufactured using a higher proportion of conventional components and equipment. Also, there is a reduction of tooling costs. When the outer container is slightly modified, it can be vacuum formed in production employing sheet plastic and inexpensive molds.

According to the invention, means are provided for more carefully adjusting the moisture application to the specific requirements of various plant species. In greater detail, the user will be provided with a list that classifies each plant in accordance with its moisture requirement by, for example, a specific numerical value. In addition, the user will be required to consider two other major factors in determining how moisture input can be regulated. The first is the moisture consumption of the plant correlated by season. Increased plant growth needs more moisture during the summer than during the winter. The second is the ability of the soil to retain moisture (e.g., whether the soil is general purpose containing humus or peat moss or, alternatively, "conditioned" by aerating additives, e.g., sand, pearlite, etc.). By considering the moisture needs of the plant, the time of year and the type of soil, one can adjust the auto-moisturizing rate to suit practically all cultural requirements.

As an illustration, suppose that the plant growing in the inventive auto-moisturizing structure has an assigned numerical value of "10," which number relates to a method of providing average moisture. The user is instructed to add (+1) to this number during summer or to subtract (−1) from this number during winter. If a general purpose soil has been mixed with an equal amount of sand, pearlite, etc., the numerical value would be increased by (+1). Thus, in winter (−1), a plant having an assigned moisture value of 10 planted in "conditioned" soil (+1), retains the original value of "10." In the summer, this same plant would have a higher numerical value to insure increased moisture input.

The outer container 12 has graduated inner markings 62,64,66 and outer markings 70,72,74. These graduations are numbered to correspond to the numerical value calculated as herein described. Accordingly, the user is instructed to fill the reservoir 28 to the calibration level corresponding to the calculated numerical value. By so adjusting the height of the initial water level in the reservoir 28, the wicking distance of the capillary action is selected to control the rate of moisture transmission into the interior of pot 10.

A second water level adjustment enables certain plant species to be partially dried for selected periods of time. More specifically, the bottom 22 of outer container 12 has graduated markings 24,25,26 located on its interior surface. These indices may be visible either from the top of the reservoir 28 or through transparent sides if provided in outer container 12. Indices 24,25,26 are calibrated along the slanting bottom 22 to indicate the number of days which have elapsed since the water level 55 in the reservoir 28 evaporated below a level whereby moisture could be absorbed by the pot. As will be observed from FIG. 1, once the water level is below the uppermost part of bottom 22, it is no longer contacting the outer porous wall of container 10.

Figure 6:
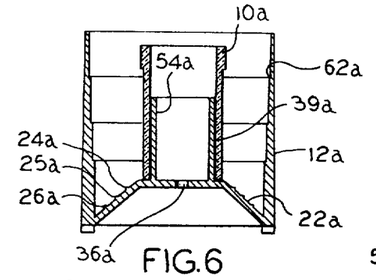
FIG. 6 is a cross-sectional representation of a first alternative embodiment utilizing a clay tile with a plastic partial liner.
Figure 7:
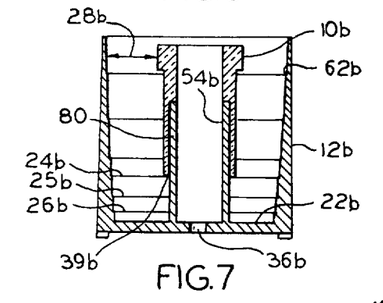
FIG. 7 is a cross-sectional representation of a second alternative embodiment modifying the structure of FIG. 6.

The invention is not necessarily limited to the particular structure and features shown and described herein. Quite the contrary, the structure may be adapted to the needs of both the manufacturer and the user. For example, the disclosed structure has no undercut sections so that it may be molded by simple and inexpensive tools. Also, the described combination of a clay pot and a simple plastic structure enables the use of conventionally available components. However, in alternative embodiments, the invention can also be practiced with special purpose structures. FIGS. 6 and 7 illustrate two embodiments incorporating these features. Each of these Figures incorporates the same reference numerals (with letter suffix) that are used in FIGS. 1-5; therefore, the description of the parts so identified will not be repeated here, except as necessary to explain the differences.

For example, the outer container 12a (FIG. 6) and the water-impervious "coating" 54a are integrally molded from plastic, as a single unit. A suitable capillary device 10a may be in the nature of a cylindrical device which is open on both ends and is placed around the "coating" 54a. The porous side walls of device 10a function as the clay pot 10 functions to wick water into the soil. The water-impervious "coating" 54a and the porous side walls 10a are adhered by a watertight seal 39a.

The clay "pot" 10a (FIG. 6) rests on top of a frusto-conical base 22a which functions as the frusto-conical base 22 of FIG. 1 functions. In another embodiment (FIG. 7), the clay pot 10b does not extend downwardly below a point 80. Therefore, the water in reservoir 28b may fall below the bottom of the porous walls 10b and into the area indexed by the markings 24b,25b,26b. The portion 54b adjacent the porous pot 10b functions as the portion of pot 10, which is lined by coating 54, functions. The water-impervious portion 54b and the porous side walls 10b are adhered by a watertight seal 39b.

If the entire pot 10 is made from plastic, either window areas or an upper edge may be formed therein at the height where the coating 54 terminates. Strips of clay, a clay pot, or the like, may then be inserted through the windows or set over the upper edge. Likewise, a different material having a crinkled surface and air-transmitting characteristics may be substituted for the fitment 56. It may also be desirable to mold an inner pot having a bottom surface area (in the region of fitment 56) with communicating passageways for air transfer.

A ceramic pot having a porosity of 11% (±1%) is a very efficient capillary medium. Such efficiency enables a rate of moisture transmission, whereby only the top 25-30% of the growing medium need be wetted. This is botanically desirable in maintaining a spatial moisture/oxygen balance. In order to maintain a bottom aeration and gas exchange as a botanical necessity, it is desirable that means be provided in order to evaporate surplus gravitational water, and to maximize the compensation for any overfeeding.

The input of moisture to a plant soil is a progressive semi-constant, whereas overtime, moisture usage by way of evaporation, transpiration, root activity, is an infinite variable. The previous embodiments focused primarily upon control of moisture input. The following embodiments focus upon means whereby any over-feed is compensated (i.e., the auto-evaporation of gravitational water on a well-ventilated container surface). The increased ventilation also enables an enhanced gas exchange which increases a plant's tolerance to slightly excessive moisture percentages, i.e., water displaces oxygen.

While a waxing of the lower interior ceramic walls is described as one appropriate interior coating in the first embodiment, alternate coatings or layerings will more readily pass moisture vapor, thereby enhancing an auto-evaporation of surplus moisture at the lower region.

Figure 8:
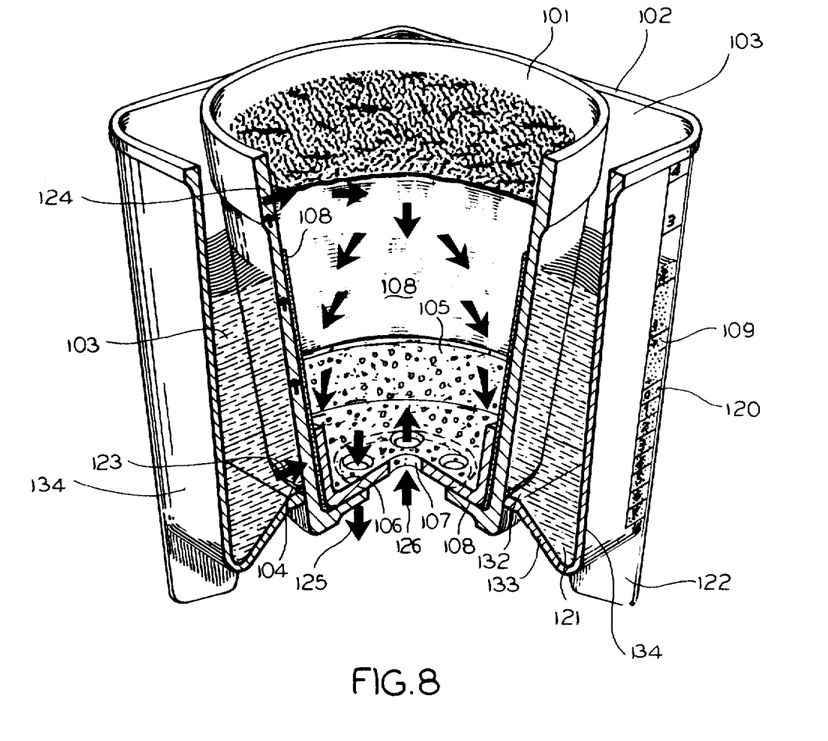
FIG. 8 is a perspective view, partially in cross section which shows the inventive plant watering system.

In FIG. 8, the invention employs a conventional porous clay pot 101 seated in an outer container 102. Container 102 may be formed of any suitable material provided that it is resistant or impermeable to the penetration of water moisture. The rim of the clay pot 101 is preferably circular and the container 102 rim is square, thereby providing increased area within the four corner regions which facilitate filling the reservoir 103.

Figure 13:
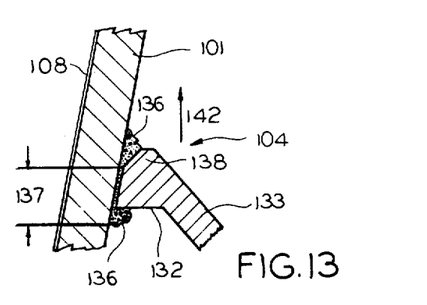
FIG. 13 is an enlarged, fragmentary view of FIG. 12, in cross section, showing the manner in which a seal is formed between the inner and outer containers.
Figure 14:
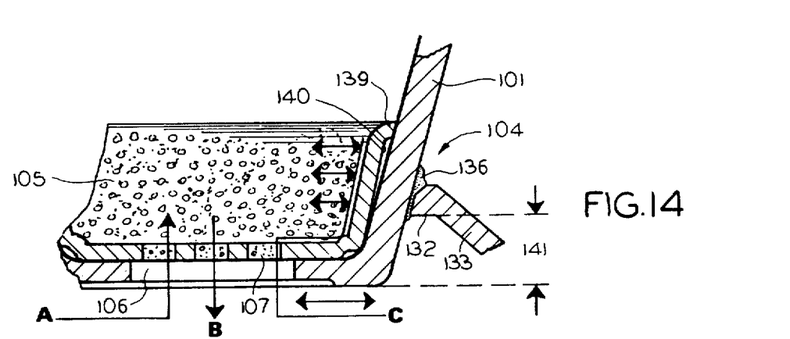
FIG. 14 is a fragmentary view, in side elevation, describing the bi-directional movement of gases and vapors.

A watertight joint is formed between pot 101 and container 102 along a lower peripheral area 104 with a sealant or adhesive 136, a more complete description of which is given in connection with the showing in FIGS. 13 and 14.

A gas permeable cup 105 is disposed in the lower region of pot 101. This cup 105 may be formed from any suitable material which is readily permeated by oxygen, carbon dioxide and water moisture vapor (e.g., foamed polystyrene, preferably produced by vacuum-forming). Cup 105 defines a plurality of holes 107, each having a diameter that retains the soil or other growing medium while enabling water to drip therefrom. Holes 107 are disposed to overlie either a single large hole 106 in the bottom wall of pot 101, or a plurality of smaller drainage holes. Conventional production methods allow drainage holes to cover at least 40% of the total bottom wall area of pot 101. This is of botanical advantage with respect to maximizing aeration.

A portion of the interior region of pot 101 is covered with a layer of a moisture-resistant coating such as wax, or the like. Wax will not pass a free liquid although it is permeable to gas. As viscous additives are blended with the wax, the resistance to moisture vapor penetration is proportionately reduced. The height of the coating is preselected with respect to the porosity (moisture-transmitting character) of the particular clay that is used to make pot 101. Pots 101 produced by different manufacturers have different ranges of porosity, through 10–12% is typical when there is a fairly strict control over kiln temperature, clay mix, and firing temperatures, which together control porosity. Therefore, the moisture transmission character of the clay, and the height at which the transmitted moisture may contact the soil or other growing medium regulates, in part, the moisture input to the plant. It is possible to omit the use of a coating if cup 105 has a height equal to the height selected for the coating; in such case, cup 105 could be formed by injection molded.

A further control to moisture input is provided by the height at which the water initially stands in the reservoir after it is filled, and also the lower level of the moisture in the soil or other growing medium at the time when the reservoir is refilled. To provide such level controls, a transparent or translucent zone scale of calibration is provided as shown at 109 and 120. The upper scale (above zero) portion 109 of the calibration comprises numbered areas which relate to a reduced wetting of the soil. The lower scale portion 120 relates to a non-wetting of the soil.

A volumetric region of container 102 which is below the sealant/adhesive area 104 is identified as 121. The water contained therein is visible through the calibration and indicates by evaporation the period during which pot 101 has been unwetted. This "calender" effect is most important for desert plants which require drying-out periods.

The assembly is supported by a plurality of feet or risers 122 which enable air to circulate freely under the clay pot and water to drain when the soil is occasionally flushed. If the feet are appropriately shaped and are hollow, this region of the container would also serve as a similar calender area.

The moisturizing and aerating system can now be explained in greater detail. The reservoir 103 is filled with water to a height indicated on scale 109, which height is recommended for a particular plant species and other related factors. Water enters the side walls of pot 101 as indicated by arrow 123 and rises by capillary action toward the pot rim. Such transmission of moisture cannot make any significant contact with the soil or other growing medium until it rises above coating 108, as shown by arrow 124.

Moisture then wicks laterally inwardly over 360° of the circumference. Some moisture is also wicked to the top-evaporating surface of the soil. However, the major portion of the wicking moisture is ultimately responsive to the pull of gravity. As the upper stratum of the soil or growing medium reaches the limit of its ability to retain moisture, any additional moisture introduced by capillary action descends to a lower stratum until it reaches the bottom area.

The relevency of bottom aeration and ventilation should now become apparent. Evaporation of moisture at the base of pot 101 is increased by design to become more equal to the evaporation at the top. This equality of evaporation results from the cooperation of the enlarged pot drainage hole 106 and the drainage holes 107 in the aerating cup 105. There is also a "breathing" characteristic of the total wall area of cup 105.

With such a provision for evaporation, as moisture descends to the bottommost stratum of the soil or other growing medium, the moisture percentage is sufficiently reduced so that it may be retained by capillary force. This feature tends to make a use of a conventional bottom saucer unnecessary.

The bottom aerating function is of prime botanical importance. Oxygen is provided to the roots as shown by the arrow 126 while respirated $CO_2$ is exhausted as shown by the arrow 125. The transmission of vapors and gases are more fully explained in FIG. 14.

Figure 9:
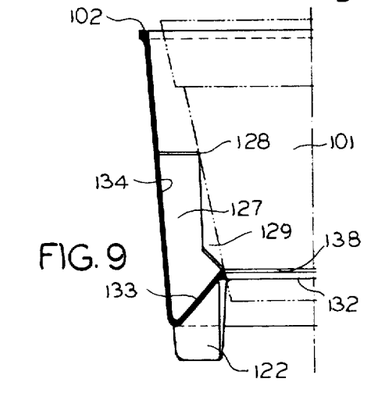
FIG. 9 is a partial side elevation of half of the outer container, shown in cross section.

Reference is made to FIG. 9 for an explanation of the construction, in greater detail. Feet or risers 122 cooperate structurally with an interior extension 127 and pot 101 supporting corner edges 128. Water may circulate freely within the spaces 129 so that the reservoir 103 has a common pool of water. Clay pot 101 is shown in FIG. 9 by means of a broken line as being disposed within a base structure.

The top rim of pot 101 is slightly higher than the top of the reservoir container 102, to prevent any spillage of water into the soil or other growing medium, when filling the reservoir.

The combination of clay pot 101 with the reservoir container 102 is most easily accomplished by automatic production means if the pot 101 is placed with its top rim facing downwardly on an endless conveyor belt. Later, container belt 102 is placed onto pot 101 since it is easier to mechanically dispense container 102, as compared to dispensing a clay pot 101. Clay pots have a typical dimensional variation of 2–3%. Presuming that the base hole 135 is dimensioned appropriately for receiving the most undersized (i.e., the shortest) pot 101, the top rim of the ceramic pot 101 would always extend upwardly beyond the top of the reservoir container 102.

Figures 10, 11, 12:
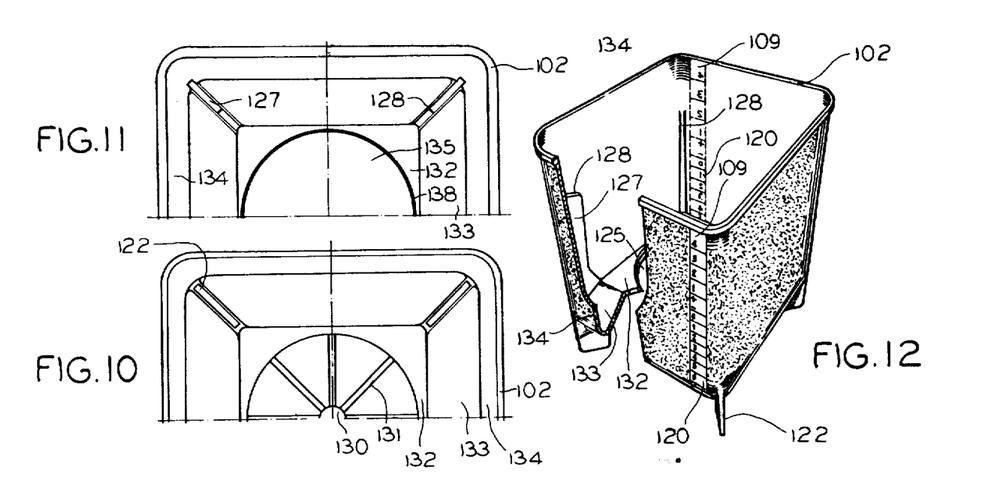
FIG. 10 is a plan view of half of the outer container as seen, looking upwardly, from the bottom.
FIG. 11 is a plan view of half of the outer container as seen, looking downwardly, from the top.
FIG. 12 is a perspective view of an embodiment of the outer container.

FIG. 10 provides production details, as they relate to the manufacturing of container 102 by an injection molding using synthetic plastic resins. The molten plastic is injected axially into area 130. Then, the plastic moves outwardly, forming the plastic gates or distributing rod members 131, and on to form base member 132. Thereafter, the molten plastic fills the mold cavity to form feet or risers 122 and, in series, base members 132 and 133, walls 134 and lastly the top of container 102.

FIG. 11 illustrates the next manufacturing step. Gate shapes 130 and 131 are redundant (once the container is formed) and are therefore broken away and removed.

These members are trimmed cleanly away by means of an elementary, semi-manual tool, leaving a hole 135.

FIG. 12 shows the final injection-molded container. It is desirable that the walls obscure from view the clay pot 101. However, the water level should also be visible in the calibration zones 109, 120. These requirements are accomplished by using a transparent or translucent plastic, which is preferably colored to match the clay. Adjacent the seals, the container 102 has a textural surface which may be imparted to the container walls by engraving the mold cavity. The texture selectively reduces the optical clarity. Those skilled in the art of plastic molding will recognize that a provision of appropriate angles to the container members enables a withdrawal of the mold core from the container interior and the container from the mold cavity.

FIG. 13 reveals details concerning a formation of a leak-proof seal between pot 101 and the horizontal base structure 132. A micropore adhesive/sealant which may be epoxy or an elastomeric (e.g., a silicone rubber, etc.) is applied to the pot periphery substantially between the area defined by the opposed arrows 141, such as in the path of application shown as 137 (FIG. 13). Pot 101 and reservoir 102 are inverted during production; therefore, the reservoir container 102 is actually positioned onto the pot 101 in the direction shown by the arrow 142. This positioning action wipes some portion of the adhesive/sealant downwardly, while a portion remains in place or is squeezed in an opposite direction. The adhesive/sealant is here shown as an intermediate part including and joined by upper and lower masses 136,136. With both containers inverted and in position, with respect to each other, epoxy, silicone rubber, or the like, is flowed over the junction therebetween in order to form a gasket. Both adhesives have a near perfect flow characteristic. A shape-bordering hole 135 and here shown as retainer wall 138 provides a retaining wall for a corresponding sealant mass which scrapes along as the pot 101 and container 102 slide together. The angle of the side edge or hole 135 corresponds to the wall angle of pot 101 and, therefore, the sealant would only be there between if some portion of the pot exterior was suitably deformed.

Once the pot 101 and container 102 are combined, the assembly is preferably inverted at the end of the conveyor belt. Pot 100 and retainer support members 127 maintain the orientation of the assembly by the bearing surfaces of a corner edge 128, as more clearly shown in FIG. 9. If the choice of adhesive/sealant were an air-curing elastomer, curing could occur away from the production area.

FIG. 14 reveals certain details in connection with the gas exchange, drainage, and evaporation cup 105, which is terminated at the rim by peripheral flange 139. The extreme outside edge of flange 139 is at least equal to the largest inside diameter in any production batch of pots 101. Foamed polystyrene is readily crushable; therefore, flange 139 would deform to fit snugly into position, thereby forming a gap 146 between cup 105 and pot 101. The snug fit described also insures against any subsequent dislocation.

Carbon dioxide (a heavy gas) is exhausted through cup holes 107, as shown by arrow B where it then mixes with the ambient air. The knowledgeable plant enthusiast generally flushes the soil or other growing medium several times a year in order to reduce a characteristic over salinity (e.g., excess fertilizer, calcium, etc.), high levels of which are toxic to most plants. This "flushing" water drains from the soil in the same manner that carbon dioxide is exhausted.

Oxygen is admitted into the soil or growing medium, directly as shown by arrow A. It is also admitted indirectly as shown by line C and the associated bi-directional arrows. Gases and vapors pass easily through the walls of cup 105. Therefore, much of the base of the soil or growing medium is well-ventilated.

The bi-directional arrows also indicate an indirect exhaust route for carbon dioxide and water moisture vapor. The water evaporates from surfaces 141 described by opposed arrows. This area can be considerably greater than that shown in the figures. The underside of pot 101 is also an evaporating surface.

According to the invention, means are provided for more carefully regulating the moisture application to the specific requirements of various plant species. Proper equilibrium represents a balance between the direct control of the input moisture (semi-constant) and the dissipation of usage of water (variable).

The instructions to the purchaser classifies all of the more popular plants into four categories of preferred moisture range. This classification is accompanied by symbols which also inform the user as to whether the species requires direct sun, part sun or bright shade, which have great influence upon the usage of water by a plant. Other factors regulating moisture equilibrium (input/usage) are temperature, relative humidity, and day length. With so many variables affecting moisture usage, it is obvious that the instructions to the user have been predetermined and based on typical indoor home-like environment. The user is instructed to fill the reservoir to a particular height upon scale 109 under all normal circumstances and to adjust the fill level to a higher or lower level, based on one or two factors (e.g., whether it is winter or summer).

Another factor to be considered during watering is the quality of the soil or other growing medium. This can be partially predetermined by identifying the plant species (e.g., the growing medium for ferns would contain much peat moss if professionally grown, cacti much sand, etc.). Inasmuch as most persons have little or no knowledge of preparing a proper transplanting soil mix, the instructions must concern itself with an average soil mix, and provide advice only if a standard mix has been altered with soil conditioners.

The user would also be instructed as a lower calibration level, which should be reached before replenishing the water in the reservoir. If the plant starts to show signs of wilting at a recommended calibrated level, one level higher is correct, at least for that growing season.

The excellent aeration at the base of the roots enables the instructions to safely recommend the top of the preferred moisture range. If roots receive an ample supply of oxygen and if they can readily dissipate carbon dioxide, some increase of the preferred moisture level is of little consequence, to most species.

Experimentation has proved that soil additives (e.g., fertilizer, systemic poison, or the like) enter the soil mass at approximately the same rate as the water is absorbed. There is no loss of chemicals through drainage as there would be by use of a conventional watering, and a considerable economy is realized. On the other hand, the importance of occasionally "flushing" the soil is strongly suggested. The inventive feature which permits this is obviously important.

The invention is described herein as being based on a double-walled container, one of which walls is at least part porous and the other is preferably not porous. It is obvious that such characteristics are not limited to the materials described herein. For example, a ceramic pot (which is inherently porous) can be glazed so that it is either part porous or even completely non-porous; therefore, it could be adapted to serve as the outer container. The same applies to other porous substrata if they are properly adapted by layering, coating, lamination, or the like.

Figure 15:
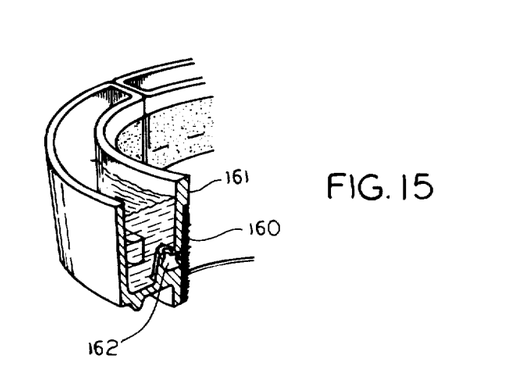
FIG. 15 is a fragmentary view of an alternative embodiment using a flocked material.

The same applies to inherently non-porous materials such as plastic, metal, etc. Such materials can be adapted to have porous characteristics which may be imparted by the addition of other materials which are capable of transmitting moisture. For example, a capillary medium may be cemented onto the wall of a plastic pot, either wholly or in select area. One such method (FIG. 15) uses a flocking 160 cut fibers (e.g., nylon and an electrostatic orientation thereof) upon the walls of a plastic pot 161. Or, a pre-flocked plastic film may be used, with a pressure-sensitive adhesive thereon for sealing against the inside of the pot 161. Any suitable waterway 162 may be provided for introducing water to the flocking.

The subject invention as disclosed herein has selected a conventional porous clay pot and a conventionally produced non-porous container for ease of comprehension, and the economic advantage of employing existing machinery. This should not limit the scope of the invention as it relates to a novel means and system for providing a moisture/oxygen balance to plants.

The principles of the invention could be applied to a hanging plant container. In such an event, a support means other than that shown herein would be required.

This disclosure describes both feet and an area 133 beneath the active part of the reservoir for use as a calender. These two functions can be combined, quite readily, in order to decrease the total height of the article. The support means could comprise a plurality of cylindrical shapes which are open-ended at the top and are hollow for receiving water from the reservoir. At least one such member would be calibrated.

This inventive disclosure makes it evident that the major solution is directed to an immutable biological problem, which is a maintenance of moisture/oxygen balance which is appropriate for varied plant species. To provide such solution to the typical user, practical matters required further solution, such having been described herein.

Therefore, the appended claims should be construed to cover all equivalent structures which fall within the true scope and spirit of the invention.

I claim:

1. A suspendable, plant-watering container for maintaining moisture/oxygen balance for roots of varied plant species, said container comprising means for aerating lower roots of said plant, said means including a container which is double walled at least in part and having an outer wall having a bottom comprising an aperture and an inner wall having at least one drainage hole leading directly to the ambient atmosphere at the bottom of the container, the space between said double walls forming a water-containing reservoir for receiving and holding water, the inner of said walls being a frusto-conical clay pot with said drainage hole in its bottom region; the outside diameter of the lower portion of said clay pot being no greater than the inside diameter of said aperture, said clay pot to be retained when inserted through said aperture, walls of said pot providing for the vertical wicking of moisture, said pot walls having at least 10% porosity for providing a moisture transmission capability, moisture-resisting means for precluding transfer of moisture from said reservoir directly through the walls of the pot and into a porous growing medium contained within said pot beneath a predetermined level while enabling said moisture to wick upwardly through said walls to a level above said predetermined level to moisten by capillarity the top 25-30% portion of said porous growing medium, whereby when said porous growing medium is wetted by said upwardly wicked water the upper portion of the growing medium being wetted to a percentage of water which results in a gravitational flow of water sufficient for a substantially even distribution of moisture inwardly and downwardly through the said growing medium, the outer wall providing a pot-bracing and orientation means extending inwardly from the outer wall, an exterior lower portion of the pot wall sitting within and protruding beneath a hole in a base wall of said water-containing reservoir means with a non-removable, waterproof, adhesive joint at the interface between said pot means and said outer wall, said joint being non-dislocatable by the levering of said pot and means whereby gases may enter and leave said porous growing medium through said drain hole, wherein water is prevented from dripping from such hole under normal watering conditions provided by said upwardly wicked water, said water evaporating to a lesser wetness by enhanced ventilation through at least the drainage portion of said clay pot which is inserted through said aperture, said water being held in place by capillary force.

* * * * *